Sept. 18, 1923.
W. F. PFANDER
BRAKE ADJUSTING MEANS
Filed April 15, 1922
1,468,033
2 Sheets-Sheet 1
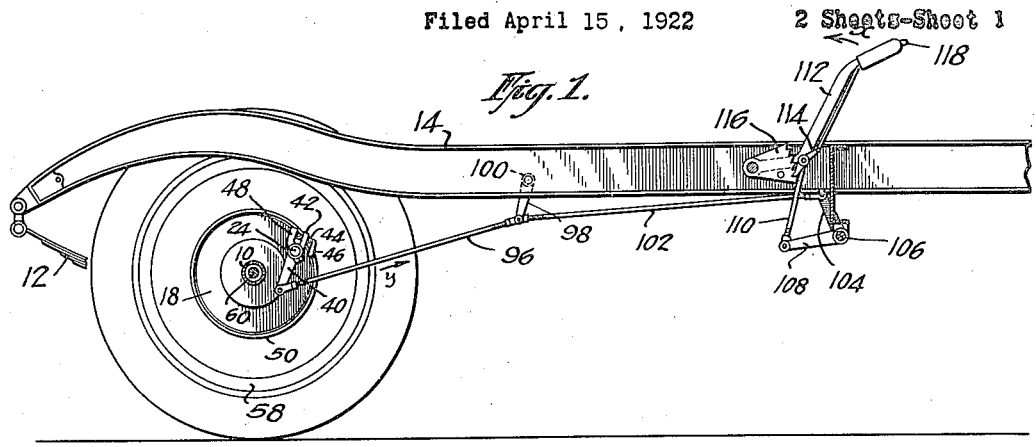
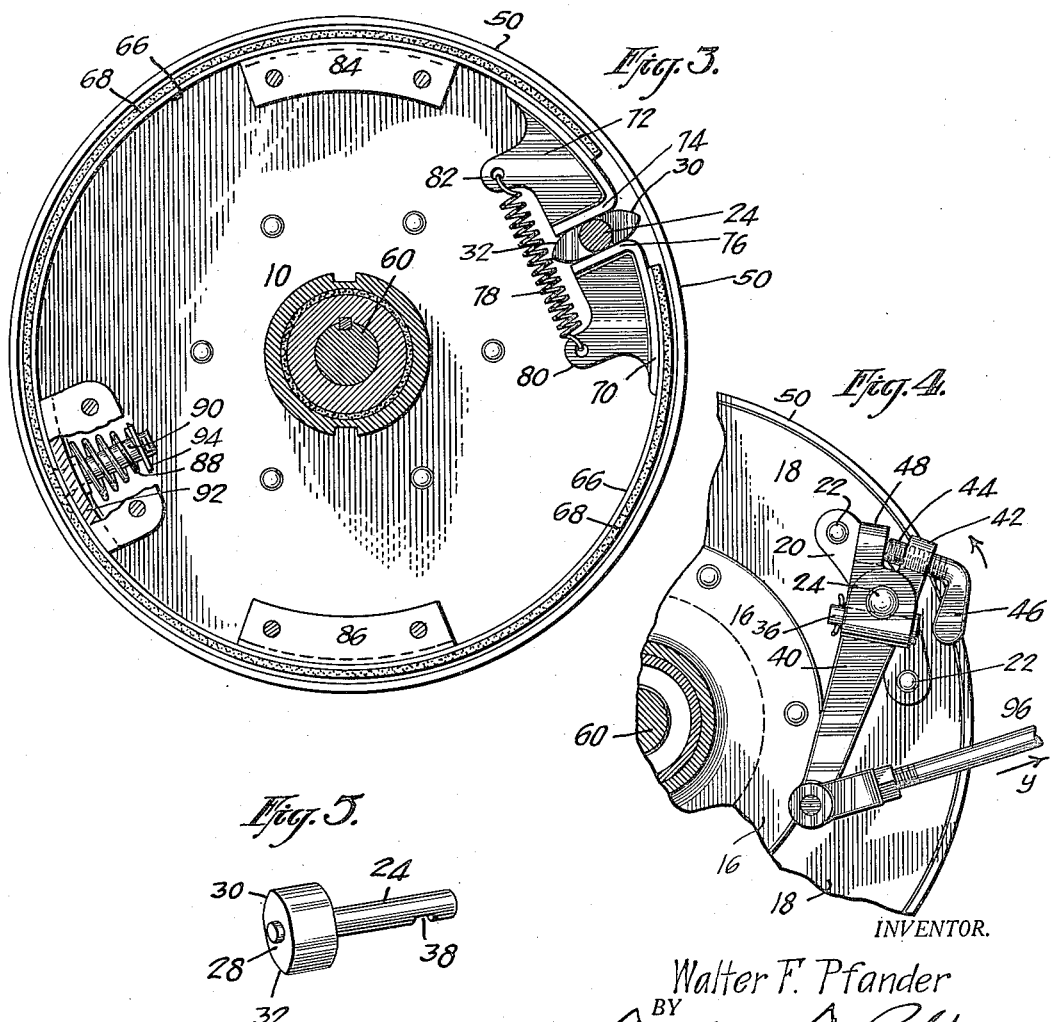
INVENTOR.
Walter F. Pfander
BY
his ATTORNEY.

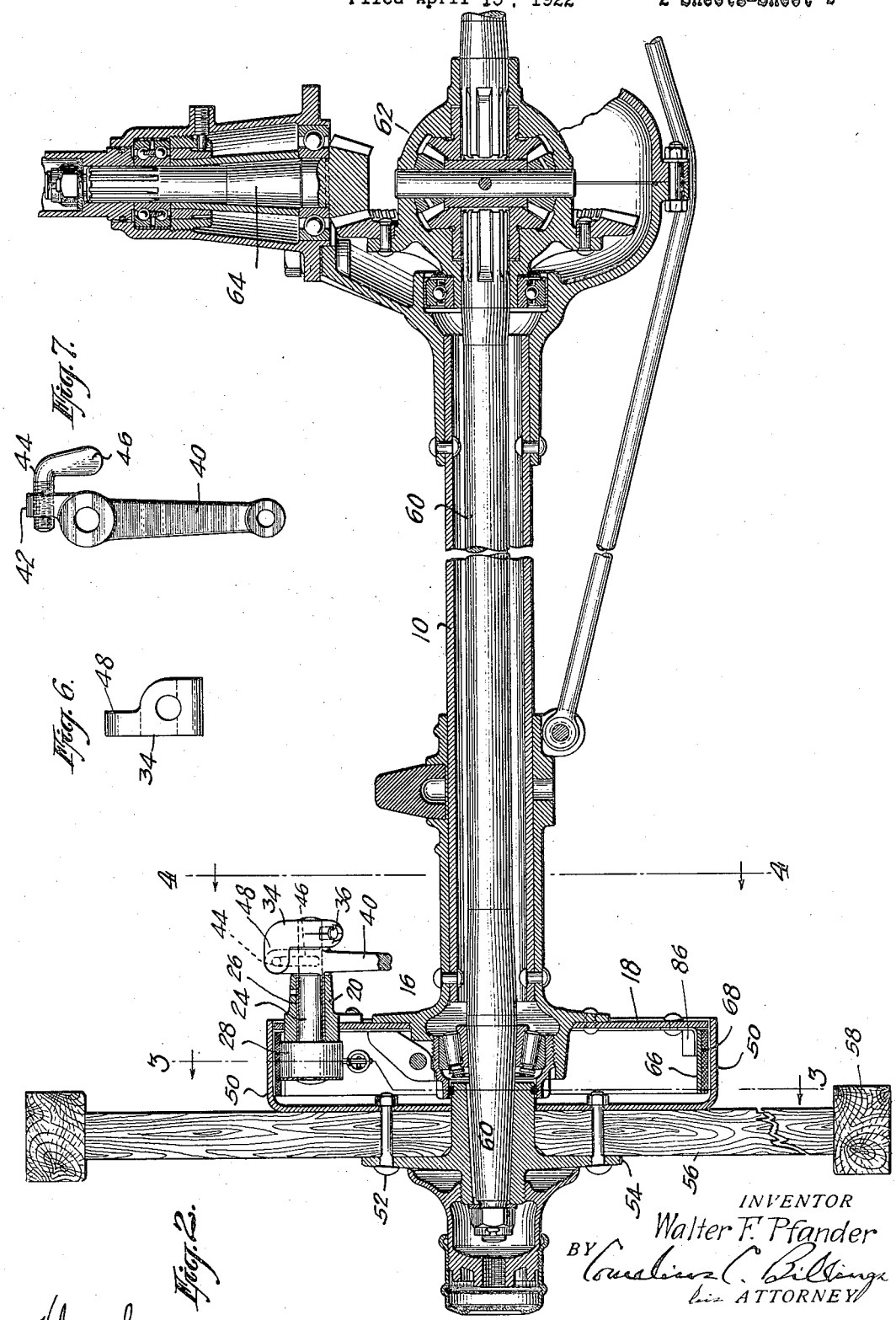

Patented Sept. 18, 1923.                                                      1,468,033

UNITED STATES PATENT OFFICE.

WALTER F. PFANDER, OF YONKERS, NEW YORK, ASSIGNOR TO DURANT MOTORS INCORPORATED, A CORPORATION OF DELAWARE.

BRAKE-ADJUSTING MEANS.

Application filed April 15, 1922. Serial No. 553,004.

*To all whom it may concern:*

Be it known that I, WALTER F. PFANDER, a citizen of the United States, and a resident of Yonkers, county of Westchester, and State of New York, have invented certain new and useful Improvements in Brake-Adjusting Means, of which the following is a specification.

This invention relates to brakes for motor vehicles and aims to provide means whereby such brakes can be readily adjusted with a minimum expenditure of time and labor to compensate for wear in the brake lining.

Heretofore in order to adjust the brakes on motor vehicles it has been necessary to disconnect various links and levers and shorten or lengthen said links by means of turn-buckles or their equivalents. In adjusting the brakes it is important that the same braking action be exerted on both rear wheels.

Before vehicles are shipped from the factory the brake connections are carefully adjusted so that an equal braking action takes place on each rear wheel. But in service the brake linings wear away unequally and in due time is is necessary to adjust the brakes to make up for this wear. This has heretofore been done by shortening certain links in the brake operating mechanism, particularly in the case of the emergency or internal brake.

My invention does away with the necessity of disconnecting any of the brake mechanism and provides means whereby the adjustments can be easily and quickly made with great accuracy.

The objects and advantages of the invention will be apparent from the following specification when read in connection with the accompanying drawings in which, Fig. 1 is a vertical section through the chassis showing a brake embodying my invention.

Fig. 2 is a horizontal section through the rear end of a vehicle equipped with my improved brake.

Fig. 3 is a section on line 3—3 of Fig. 2.

Fig. 4 is a fragmentary section on line 4—4 of Fig. 2.

Figs. 5, 6 and 7 are details of parts of the brake operating mechanism.

Referring first to Figs. 1 and 2, the rear axle be using 10 is supported in the usual manner on suitable springs 12 secured to the frame or chassis 14. To each end of the axle housing 10 is secured a flanged member 16, which, in turn, supports a circular plate 18 on which the brake actuating mechanism is mounted. A bracket 20 is secured by rivets 22 to the plate 18 and this bracket carries a shaft 24 which passes through a suitable bushing 26 mounted in said bracket. Secured to the outer end of the shaft 24 is a bracket actuating cam 28, having diametrically opposing cam surfaces 30 and 32. To the outer end of the shaft 24 is fixedly secured a member 34, said member being fastened to the shaft 24 by means of a key-pin 36, which engages a cut-away portion 38 formed in the shaft 24, this cut-away portion being clearly shown in Fig. 5. Located between the member 34 and the bracket 20 on the shaft 24 is loosely mounted an operating lever 40. This lever is provided with an up-standing lug 42 through which is threaded an adjusting screw 44, having a thumb piece 46 formed thereon. This adjusting screw is adapted to engage an ear 48 which is formed on the member 34 and so shaped that it projects angularly to bring it opposite to the adjusting screw 44, as clearly shown in Fig. 2.

A suitable brake band 50 is secured by bolts 52 to a flanged member 54 carried by the spokes 56 of the driving wheel 58. This flanged member 54 is keyed to the rear axle shaft 60. This rear axle is driven in any suitable manner through the usual differential gearing 62 which receives its drive from a suitable propeller shaft 64.

Located within the brake drum 50 is a separate brake band 66, having a brake lining 68 of suitable brake fabric riveted or otherwise secured thereto. This brake band has secured to each end castings 70 and 72, the flanges 74 and 76 of which are normally held in engagement with the cam 30 by means of a tension spring 78 secured to lugs 80 and 82 formed on the castings 70 and 72 respectively. The brake band 66 is positioned by means of angle brackets 84 and 86 secured to the circular plate 18. A spring 88 surrounds a pin 90 carried by the band 66, one end of said spring pressing against a flanged bracket 92, also secured to the circular plate 18, and the other end of said spring pressing against a washer 94, this spring being adapted to normally hold the brake band out of engagement with the brake drum.

The operating lever 40, as shown in Fig. 1, is connected by means of a link 96 to a lever 98 pivoted at 100 to the chassis 14. This lever 98 is in turn connected by a rod 102 with a lever 104 on a cross shaft 106. The cross shaft carries a lever 108 which in turn is connected by a link 110 with the emergency brake lever 112. This brake lever carries a pawl 114 adapted to engage teeth in a fixed sector 116, and the pawl is arranged to be released by a suitable button 118 in the brake lever.

As thus connected it will be seen that when the brake lever 112 is pulled back in the direction of the arrow $x$, the rod 96 will be pulled in the direction of the arrow $y$, which will turn the shaft 24 counterclockwise, as shown in Figs. 1 and 4, due to the engagement between the adjustable screw 44 and the lug 48 on the member 34, which member is fixedly secured to the shaft 24. A turning of the shaft 24 will cause the cam surfaces 30 and 32 to expand the link 66 and thereby cause the same to forcibly grip or exert a frictional braking action on the drum 50.

Due to the fact that the member 34 is fixedly secured to the shaft 24 and the control lever 40 is loosely mounted on said shaft it is possible, by turning the adjusting screw 44, to adjust the position of the member 34 relatively to the control lever 40. This will cause the cam 28 to be turned slightly so as to slightly expand the brake band 66. It is clear that the amount of adjustment can be varied by turning the adjusting screw through one or more revolutions.

It will be understood by those skilled in the art that my invention provides means whereby the wear on the brake bands can readily be compensated for merely by turning the adjusting screw 46. This is a much simpler operation than that of disconnecting the links connecting the usual brake operating mechanism.

Though I have described with considerable detail the embodiment of the invention herein illustrated, it is not to be construed that I am limited thereto as various changes and modifications may be made by those skilled in the art without departing from the invention as described in the appended claims.

Having thus described my invention what I claim as new and desire to secure by Letters Patent is:—

1. A motor vehicle brake comprising a brake drum, an internal expanding band adapted to grip said drum, a shaft carrying a cam adapted to expand said band, an operating lever loosely mounted on said shaft, a fixed member fixedly secured to said shaft in juxtaposition to said operating lever, and an adjusting screw carried by said operating lever and engaging said member.

2. In combination with a friction brake band and brake drum, a cam for causing said band to grip said drum, and means for actuating said cam including an operating lever having an adjusting screw and means operatively connected with said cam adapted to be engaged by said adjusting screw.

3. A motor vehicle brake comprising a brake drum, an internal band adapted to grip said drum, a shaft carrying a means to expand said band, an operating lever loosely mounted on said shaft, a fixed member fixedly secured to said shaft in juxtaposition to said operating lever, and an adjusting screw carried by said operating lever and engaging said member.

4. A motor vehicle brake comprising a brake drum, an internal expanding band adapted to grip said drum, a shaft carrying a cam adapted to expand said band, an operating lever loosely mounted on said shaft, a lever fixedly secured to said shaft in juxtaposition to said operating lever, and means between said levers the length of which between said levers may be adjusted to vary the angular distance between said levers.

In witness whereof I have hereunto set my hand this 13th day of April, 1922.

WALTER F. PFANDER.